United States Patent
Hill et al.

(10) Patent No.: US 7,349,384 B2
(45) Date of Patent: Mar. 25, 2008

(54) RELIABLE ONE-WAY MESSAGING OVER REQUEST-RESPONSE TRANSPORT PROTOCOLS

(75) Inventors: Richard D. Hill, Kirkland, WA (US); Stefan R. Batres, Sammamish, WA (US); Shy Cohen, Bellevue, WA (US); Michael T. Dice, Redmond, WA (US); Rodney T. Limprecht, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 11/009,420

(22) Filed: Dec. 10, 2004

(65) Prior Publication Data

US 2006/0129690 A1 Jun. 15, 2006

(51) Int. Cl.
- *H04J 3/16* (2006.01)
- *H04L 12/66* (2006.01)
- *G06F 15/16* (2006.01)

(52) U.S. Cl. ............ 370/352; 370/410; 370/465; 709/220; 709/230

(58) Field of Classification Search ............ 370/235, 370/236.1, 249, 352, 395.1, 410, 465; 709/220, 709/223, 227, 230, 231, 246
See application file for complete search history.

(56) References Cited

FOREIGN PATENT DOCUMENTS

EP     1 462 941     9/2004

OTHER PUBLICATIONS

*Web Services Reliable Messaging TC: WS-Reliability 1.1*, Kazunori Iwasa, et al. eds., Committee Draft 1.086, Aug. 24, 2004, pp. 1-72, available at http://docs.oasis-open.org/wsrm/2004/06/WS-Reliability-CD1.086.pdf (a copy is attached hereto).

Bilorusets, et al., *Web Services Reliable Messaging Protocol (WS-ReliableMessaging)*, Copyright 2002-2004 BEA Systems, Inc., International Business Machines Corporation, Microsoft corporation, Inc., and TIBCO Software, Inc., Mar. 2004, pp. 1-40, available at ftp://www6.software.ibm.com/software/developer/library/ws-reliablemessaging200403.pdf (a copy is attached hereto).

(Continued)

*Primary Examiner*—Afsar Qureshi
(74) *Attorney, Agent, or Firm*—Workman Nydegger (57) ABSTRACT

Example embodiments provide for a binding mechanism between RM protocols and request-response transport protocols (e.g., HTTP) in a one-way message exchange pattern. The present invention leverages existing network characteristics of request-response transport protocols without reconfiguration or deployment of new infrastructure services. A request-response transport model is asymmetrical in nature and provides two data-flows; a request flow and a reply flow. When an initiator is not addressable and/or when communication requires a request-response transport, the present invention allows infrastructure and application messages to be sent on the request flow, while acknowledgments and other infrastructure messages may be sent back across the reply flow of the transport.

39 Claims, 4 Drawing Sheets

OTHER PUBLICATIONS

Fielding, et al., part of *Hypertext Transfer Protocol—HTTP/1.1*, Introduction, pp. 1-5, *available at* http://www.w3.org/Protocols/rfc2616/rfc2616-sec1.html (a copy is attached hereto).

Fielding, et al., part of *Hypertext Transfer Protocol—HTTP/1.1*, 10 Status Code Definitions, pp. 1-11, *available at* http://www.w3.org/Protocols/rfc2616/rfc2616-sec10.html (a copy is attached hereto).

Banks, et al., *HTTPR Specification*, Francis Parr ed., Apr. 1, 2002, pp. 1-57, *available at* http://www-128.ibm.com/developerworks/webservices/library/ws-httprspec/index.html (a copy is attached hereto).

*Web Services Architecture*, David Booth, et al., eds., W3C Working Group Note, Feb. 11, 2004, pp. 1-106, *available at* http://www.w3.org/TR/ws-arch/ (a copy is attached hereto).

Fig. 3

# RELIABLE ONE-WAY MESSAGING OVER REQUEST-RESPONSE TRANSPORT PROTOCOLS

CROSS-REFERENCE TO RELATED APPLICATIONS

N/A

BACKGROUND OF THE INVENTION

1. The Field of the Invention

The present invention is generally related to Reliable Messaging protocols for distributed systems, e.g., Web Services. More specifically, the present invention provides for a binding of Reliable Messing protocols for distributed systems to request-response transport protocols (e.g., HTTP) in a one-way message exchange pattern environment.

2. Background and Related Art

Computer networks have enhanced our ability to communicate and access information by allowing one computer or device to communicate over a network with another computing system using electronic messages. When transferring an electronic message between computing systems, the electronic message will often pass through a protocol stack that performs operations on the data within the electronic message (e.g., parsing, routing, flow control, etc.). The Open System Interconnect (OSI) model is an example of a network framework for implementing a protocol stack.

The OSI model breaks down the operations for transferring an electronic message into seven distinct layers, each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to the higher intermediate layers and then is eventually received at that application layer. The application layer—the upper most layer—is responsible for supporting application and end-user processing. Further, within the application layer there may reside several other layers (e.g., the Simple Open Access Protocol (SOAP) layer). Another layer incorporated by most protocol stacks is the transport layer. An example of a transport layer is the Transmission Control Protocol (TCP).

Web Services (WS) have been a driving force in advancing communications between computing systems and are turning the way we build and use software inside-out. Web Services let applications share data and—more powerfully—invoke capabilities from other applications without regard to how these applications where built; what operating systems or platform they run on; and what devices are used to access them. Web Services are invoked over the Internet by means of industry-standard protocols including SOAP, XML (eXtensible Markup Language), UDDI (Universal, Description, Discovery and Integration), WSDL (Web Service Description Language), etc. Although Web Services remain independent of each other, they can loosely link themselves into a collaborating group that performs a particular task.

Current WS technologies offer direct SOAP-message communication between an initiator (e.g., a client) and an acceptor (e.g., a service). In the common bi-directional messaging case, a SOAP request message is sent from the initiator to the acceptor and a SOAP reply message is sent in response thereto. Another communication variant between endpoints is unidirectional message, where the initiator sends a message to the acceptor with no response.

A key benefit of the emerging WS architecture is the ability to deliver integrated, interoperable solutions. Because, however, Web Services provide various services from different business, originations, and other service providers via unreliable communication channels such as the Internet, reliability of WS becomes an increasing important factor. Reliability of WS is impacted by several factors including but not limited to, the reliability of the Web Service endpoints; reliability characteristics of the communication channel over which the Web Services are accessed; performance and fault-tolerance characteristics; and the extent to which Web Services can handle concurrent client access.

There have been attempts at accomplishing reliable messaging of Web Services by choosing a reliable transport protocol over which the messages (e.g., SOAP messages) are exchanged between endpoints. For example, a reliable messaging transport such as message-queues can be used to deliver messages reliably between initiators and acceptors. Message-queuing communication technologies enable applications on different systems to communicate with each other by sending messages to queues and reading messages from queues that are persisted across failures for reliability.

Although queuing systems offer a transport that can be used to carry SOAP messages reliably, there are several drawbacks to such systems. For instance, these systems offer solutions for an asynchronous operation where the requests (and possibly their responses) are transferred and processed with isolation. Accordingly, these systems are typically heavyweight in terms of resources; involving multiple intermediaries with durable transacted message stores and with considerably more complexity in deployment, programming model and management. All of this is unnecessary for reliable direct communication, and detracts from the goal of minimizing latency. Further, the program model does not directly support request-response style programming or sessions. Accordingly, the queued communication model is different from the current "interactive" Web Services model, and does not address critical "connected" scenarios and "interactive" applications. For example, it is not well suited for cases where a response is expected in a timely manner, or for cases where distributed-transaction-context need to be shared between initiator and acceptor.

There have also been attempts at defining reliable transfer layers over fundamentally unreliable transport protocols, e.g., reliable HTTP or HTTPR. A common problem, however, that plagues this solution—as well as the queuing solution—is that reliable messaging can be achieved only if the specific reliable transport protocol is used for communication between the initiator and the acceptor. The fundamental nature of Web Services calls for independence from specific vender platform, implementation languages and specific transport protocols. In a generic case, an initiator may not be able to transmit a message directly to an acceptor using a particular protocol (e.g., acceptor does not support the protocol) or the message may need to pass through multiple hops after leaving the sending node prior to arriving at that destination node. Depending on the nature of the connectivity between the two nodes involved in a particular hop, a suitable transport protocol that does not offer reliable messaging characteristics may have to be chosen.

Intermediaries may also exist at different levels in the protocol stack; and therefore, not offer full end-to-end reliability. For example, transport protocols may offer reliability across lower level intermediaries (e.g., IP level intermediaries—e.g., IP routers). The transport protocol may end, however, at a SOAP intermediary or application layer (e.g. an HTTP Proxy). Accordingly, the transport protocol may not be able to offer reliability across that intermediary, i.e., no end-to-end reliability across the application layer.

More recently, various Reliable Messaging protocols for distributed systems (hereinafter referred to as "RM protocols"), offer solutions to the above identified-deficiencies of current reliable messaging systems. These protocols (e.g., RM protocols for Web Services (WS), which include WS-ReliableMessaging, WS-Reliability, etc.) are transport agnostic connected protocols that allow messages to be delivered reliably between endpoint applications in presences of software component, system or network failures. Accordingly, RM protocols offer solutions for reliable, end-to-end, and potentially session-oriented communication between an initiator and an acceptor.

These RM protocols are akin to TCP in that TCP offers reliable, exactly-once, in-order delivery of a stream of bytes from a TCP sender to TCP receiver across Internet Protocol (IP) routers and multiple networks. Reliable Messaging protocols for distributed systems offer the same and more for messages (note: the unit of transfer is a message, not a byte) across multiple intermediaries (including transport and SOAP level intermediaries), transports and connections. Although TCP and RM protocols are both "reliable" protocols, because RM protocols (and, more generally, the SOAP layer) reside at the application in the OSI model, RM protocols provide for reliable messaging regardless of the transport protocol used to transfer the data. Accordingly, RM protocols are not tied to a particular transport or other protocol used to transfer message between endpoints.

Although a few RM protocols have been around for some time there are still several drawbacks and deficiencies of these protocol specs. For example, Reliable Messaging protocols for distributed systems typically require bi-directional message exchange; i.e., application messages go in one direction and infrastructure acknowledgments go in the other direction. Further, there are cases where unsolicited acceptor-to-initiator communication is not possible; for instance, when the initiator is behind a firewall and uses a request-response transport protocol (e.g., HTTP) connection (by, e.g., tunneling through a HTTP proxy) to communicate with the acceptor. A problem arises, however, in being able to send acknowledgments and other infrastructure messages to the initiator since the initiator is typically not addressable and/or communication is restricted to a request-response transport protocol. Accordingly, a need arises for orchestrating the reliable sending of application-level messages in a one-way message exchange pattern from an initiator to the acceptor—and RM infrastructure messages in both directions—over a transport that offers a request-response messaging pattern.

BRIEF SUMMARY OF THE INVENTION

The above-identified deficiencies and drawbacks of current Reliable Messaging protocols for distributed systems (e.g., Web Services) are overcome through example embodiments of the present invention. Exemplary embodiments provide a Reliable Messaging protocol for distributed systems (RM protocol, e.g., WS-ReliableMessaging) when sending application-level messages over a request-response transport protocol by leveraging existing network characteristics of the request-response transport protocol without reconfiguration or deployment of new infrastructure services.

At an initiator computing device, example embodiments provide for creating an application-level message at an initiator endpoint for a reliable one-way message exchange pattern of the application-level message with an acceptor endpoint. The application-level message is then formatted in accordance with a Reliable Messaging protocol for a distributed system (RM protocol). Thereafter, the application-level message is sent over a request flow of a request-response transport protocol. A corresponding-transport-level response message is then received over a reply flow of the request-response transport and is linked to RM protocol infrastructure information in order to comply with the RM protocol.

From an acceptor computing device, other example embodiments provide for receiving an application-level message in a reliable one-way message exchange pattern from an initiator to an acceptor. The application-level message being received over a request flow of an anonymous request-response transport protocol. Further, the application-level message is identified as being formatted in accordance with a Reliable Messaging protocol for distributed systems (RM protocol). RM protocol infrastructure information is then linked to a transport-level response, wherein the infrastructure information corresponds to a reliable exchange of one or more application-level messages. Thereafter, the transport-level response is then sent over a reply flow of the request-response transport protocol in order to comply with the RM protocol.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for binding a Reliable Messaging protocol for a distributed system (e.g., Web Services) to a request-response transport protocol (e.g., HTTP) in a one-way message exchange pattern between endpoints. The embodiments of the present invention may comprise a special purpose or general-purpose computer including various computer hardware, as discussed in greater detail below.

The present invention is directed towards extensions of Reliable Messaging protocols for distributed systems (hereinafter referred to as "RM" protocols), which describes protocols that allow messages to be delivered reliably between distributed applications in the presence of software component, system or network failures. Reliable Messaging protocols for distributed systems (e.g., Web Services) facilitate the successful transmission of a message from a source (hereinafter "an initiator") to a destination, e.g., a service, (hereinafter "an acceptor") and ensures that error conditions are detectable. These protocols are transport agnostic, allowing them to be implemented using different network transfer technologies. Further, various implementations of reliable messaging protocols hide intermittent communication failures from the applications, and may provide recoverability in case of system failures.

As mentioned above, example embodiments provide for a binding mechanism between RM protocols and request-response transport protocols (e.g., HTTP). The present invention leverages existing network characteristics of request-response transport protocols without reconfiguration or deployment of new infrastructure services. A request-reply transport model is asymmetrical in nature and provides two data-flows; a request flow and a reply flow. Such request-response model restricts the messaging pattern such that a response message can only be sent in reply to and following a request message, using a transport connection offered by the request. A canonical example of a request-reply transport (e.g., SOAP transport) protocol is "anonymous HTTP," where the initiator is not addressable and can only receive messages using the reply flow of the HTTP protocol.

Exemplary embodiments utilize such reply flows for sending acknowledgments and other infrastructure messages to an initiator. The details for anonymous request-response transport protocols as described herein extend to any request-reply transport protocol where the initiator is not directly addressable (i.e., there is no way to send an initiator unsolicited messages). Note, however, that the present invention is not limited to anonymous request-response transport protocols, but applies to any communication that is restricted to a request-response transport protocol. Accordingly, any specific use of a request-response transport protocol as described herein is used for illustrative purposes only and is not meant to limit or otherwise narrow the scope of the present invention unless explicitly claimed.

Figure 1A:
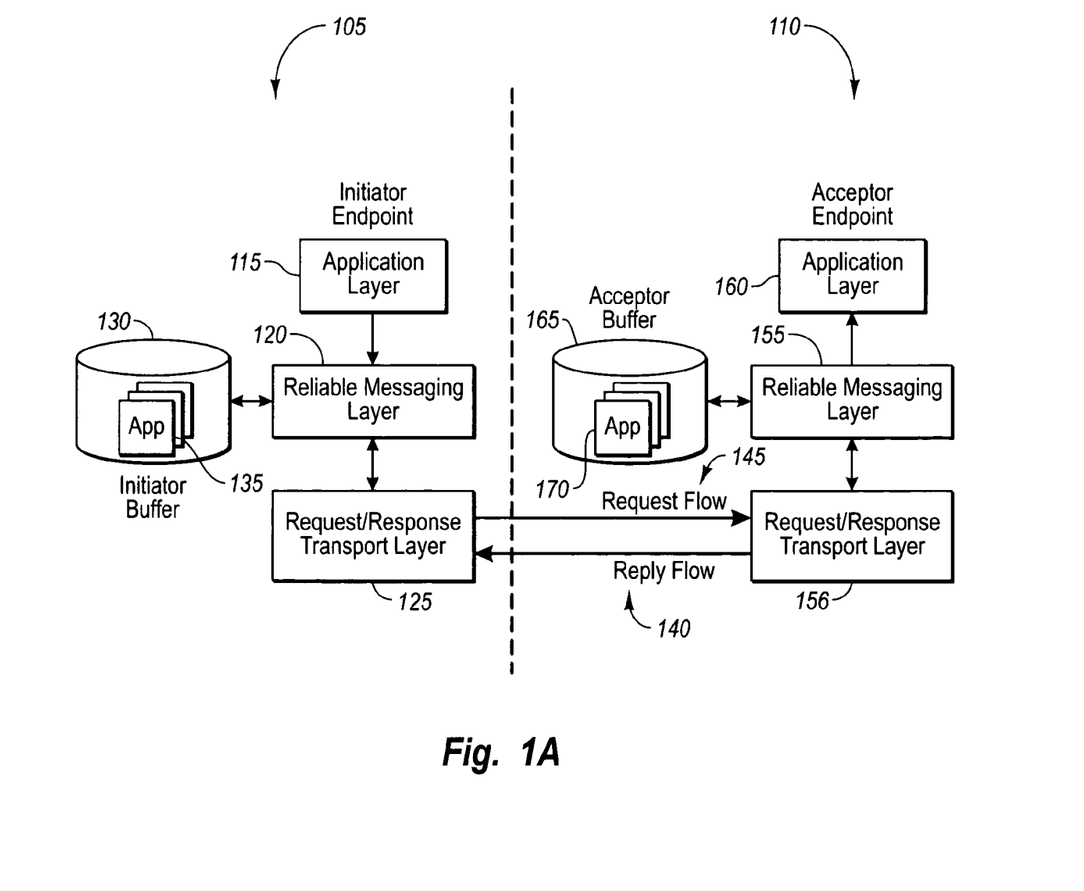
FIG. 1A illustrates a protocol stack for a reliable one-way exchange pattern of an application-level message over a request-response transport protocol in accordance with example embodiments.

FIG. 1A illustrates a protocol stack for a reliable unidirectional message exchange pattern over a request-response transport protocol in accordance with example embodiments. An application-level message (not shown) may be generated by initiator endpoint 105 at the application layer 115 in accordance with a distributed system protocol, e.g., a Web Services protocol. Typically in Web Services, the application-level message will be a SOAP message with appropriate SOAP headers. Further, the message is considered one-way in that it will typically include an input operation for processing at the acceptor endpoint 110; however, no output application layer 160 messages flow from the acceptor endpoint 110 back to the initiator endpoint 105.

The application-level message will be passed to the reliable messaging layer 120 wherein it is formatted in accordance with an RM protocol (e.g., WS-ReliableMessaging, WS-Reliability, etc.). Messages 135 that are received at the reliable messaging layer 120 are also stored in an initiator buffer 130 for a possible resend if no corresponding acknowledgment messages are received, as described below. The application-level message is then sent across a request flow 145 of a request-response transport layer 125 (e.g., anonymous HTTP) and received at the transport layer 156 of the acceptor endpoint 110. The application-level message is passed to the reliable messaging layer 155, which stores the received messages 170 in an acceptor buffer 165 for subsequent processing at an application layer 160 of the acceptor endpoint 110.

Note that a one-way line is drawn from the reliable messaging layer 155 to the application layer 160, indicating that no application layer 160 messages flow to the initiator endpoint 105 since the initiator endpoint is typically not addressable and/or the communication requires request-response type protocol. As previously mentioned, however, exemplary embodiments utilize the reply flow 140 characteristics of typical request-response transport protocols, e.g., HTTP, for sending acknowledgment responses (not shown) and other infrastructure messages over the request-response transport layer 156, 125. In other words, RM infrastructure information is linked to or piggybacked on a transport-level response message.

Further note that the infrastructure information linked to the transport-level response message may be characterized in several different ways. For example, the infrastructure information (e.g., Ack response) can be generated and encapsulated in the transport-level response, which is then carried over the reply flow 140 of the request-reply transport protocol. This is similar to characterizing the transport-level response message as being formatted within the infrastructure information. Of course, there are other ways to characterize how the infrastructure information is linked to the transport-level response message. Further, there are many well known ways to encapsulate or format the transport-level response message with the infrastructure information. Accordingly, linking the infrastructure information to the transport-level response message as applied to the present invention should be broadly construed to encompass any type of process for formatting or piggybacking the infrastructure information on the transport-level response message.

Regardless of how the infrastructure information is linked to the transport-level response and received at the initiator endpoint 105 across the reply flow 140, if the infrastructure information is an acknowledgment response (e.g., an Ack message defined by WS-ReliableMessaging) the reliable messaging layer 120 will remove the appropriate application message 135 from the initiator buffer 130. Note, however, that, if acknowledgments are not received for messages, the initiator endpoint 105 can retry sending the messages 135 in a similar fashion as that described above (i.e., by initiating a new request using the request-response transport in accordance with the RM protocol). If no acknowledgments are received after a certain time limit, a predetermined number of retries, or any other retry-policy governing mechanism, a failure notice may be raised to the application layer 115.

Note that infrastructure messages (e.g., a create sequence or terminate sequence request) from the reliable messaging layer 120, 155 can be sent in either direction, but are subject to the constraints of the request-response transport. In particular, infrastructure message from the acceptor endpoint 110 can only occur on transport-level responses following initiator requests. Further note that a transport request message can also include the application-level message as well as infrastructure (RM protocol) information (e.g., as fields within a SOAP header).

As noted above, the acknowledgment messages and other infrastructure messages need to be sent on the request-reply transport reply flow 140. If, however, the acceptor endpoint 110 receives an application-level message but decides not to send an acknowledgment, it should still send a standard transport-level response (e.g., a null response) to comply with the request-response transport protocol. The initiating endpoint 105 may not infer any special meaning from such a null response other than that the transport level request has been completed, and that this response flow is no longer available for the acceptor endpoint 110 to transfer an infrastructure message. For example, in the case of HTTP, the acceptor endpoint 110 could respond with an HTTP 202 OK, 204 No Content, or other similar HTTP-level response message. Note that this response is not processed by the RM infrastructure, but the RM infrastructure may be made aware that a transport-level response was received if it needs to know that it should not wait for an RM infrastructure response message.

Other example embodiments support the creation and use of an RM sequence session for reliably transferring one or more messages in a one-way message exchange pattern in accordance with RM protocols. A request to create the sequence session can be received over the request flow 145 of a connection (linked, e.g., to an application-level message), and a unique sequence identifier will typically be immediately sent over the reply flow 140 of the same transport connection. Note, however, that there are other ways of creating a sequence session that are available to the present invention. For example, the initiator endpoint 105 may generate the unique sequence identifier and send it in the request, or the unique sequence identifier may be sent out-of-band. Accordingly, any well known way of establishing a sequence session is available to the present invention and any specific reference to how the sequence session is established is used for illustrative purposes only and is not meant to limit or otherwise narrow the scope of the present invention unless explicitly claimed.

Typically, sequence acknowledgments should be sent when receiving the corresponding application messages. In other words, rather than delaying and batching acknowledgments for a sequence, example embodiments provide that a one to one correspondence should be used between a message and its acknowledgment, i.e., messages flow across the request flow 145 and corresponding acknowledgments are received on the reply flow 140. Note, however, that a batching process is also available to the present invention. For instance, before receiving a last message indication—or even at the time of receiving a last message indication—a batch acknowledgment may be sent to the initiator 105 over the reply flow 140. As mentioned above, however, if acknowledgments are not immediately sent, standard transport-level responses should still be sent to the initiator 105 in order to comply with the request-response transport protocol's requirement.

Regardless of the type of acknowledgment (i.e., batch or individual), the acknowledgments should be sent to the initiator endpoint 105 on the reply flows 140 of incoming connections, and only on those reply flows 140s for the sequence session. Nevertheless, the initiator endpoint 105 may send messages (either infrastructure or application-level messages) on a new request-response connection without waiting for acknowledgment messages for previously sent messages. The initiator endpoint 105 may wish to send messages without receiving acknowledgments for several reasons. For example, the initiator endpoint 105 may need to retry transmission of an application-level message 135 that have not been acknowledged. Alternatively, or in conjunction, the initiator endpoint 105 may wish to send new messages that have been generated under the assumption that the acceptor endpoint 110 is batching acknowledgments. Further, the initiator endpoint 105 may wish to send infrastructure messages to the acceptor endpoint 110, and in turn, provide the acceptor endpoint 110 with the opportunity to use the transport response to communication acknowledgments that, e.g., may have been batched or lost in a failed transport response.

Other example embodiments provide that the acceptor endpoint 110 may drop an application message that it receives and not acknowledge it. An accepter endpoint 110 may choose to do this if the sequence is ordered and the message was received out of order, or due to lack of buffer space to store the message (e.g., flow control), or for any number of other reasons. Note, however, that the acceptor endpoint 110 should respond in any event with at least a standard transport-level response on the reply flow 140 in order to comply with the transport protocol's requirements.

Still other example embodiments provide for the ability to terminate an established unidirectional sequence over the anonymous request-response transport protocol. Similar to the sequence session creation process described above, a terminate sequence infrastructure message can be sent over a request flow 145 of a connection. The terminate sequence message may be linked to an application-level message by infrastructure protocol (e.g., as a header field) or as an infrastructure message. In any event, the acceptor endpoint 110 should will typically reply with a sequence acknowledgment for the last message sent for the sequence session (assuming all of the messages were received for the sequence session) in order to comply with the RM protocol. Nevertheless, if for whatever reason an acknowledgment or other infrastructure message is not sent by the acceptor 110, a standard transport-response on the reply flow 140 should at least be sent in order to comply with the transport protocol.

Figure 1B:
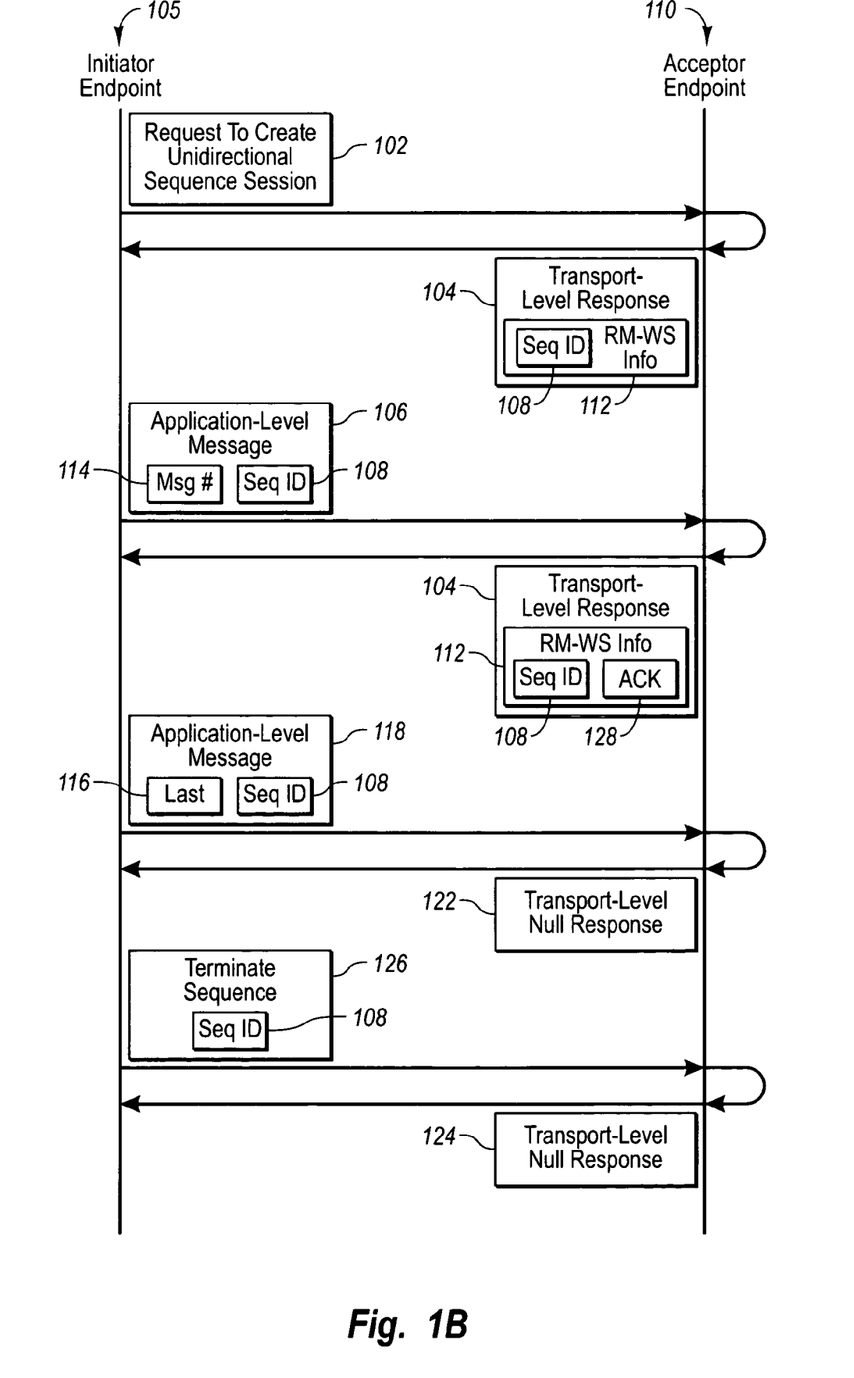
FIG. 1B illustrates a diagram of a potential reliable one-way message sequence exchange over a request-response transport protocol in accordance with example embodiments.

FIG. 1B illustrates a diagram of a potential RM protocol message sequence exchange over a request-response transport protocol in accordance with example embodiments. As shown, initiator endpoint 105 makes a request to create a unidirectional sequence session 102 and sends it on the request flow of an anonymous request-response transport. Note that arrows flowing from initiator endpoint 105 to acceptor endpoint 110 indicate a request flow of the transport protocol, wherein arrows circling back from the acceptor endpoint 110 to the initiator endpoint 105 indicate the reply flow of the request-response transport. Further note, that the request to create the unidirectional sequence session 102 may be included within an application-level message.

In response to the request to create a unidirectional RM protocol sequence session 102, acceptor endpoint 110 will send a transport-level response 104 back to the initiator 105 on the reply flow of the transport. As shown in this example, this transport-level response 104 includes RM infrastructure information such as a sequence you identifier 108 for the unidirectional RM sequence session. In other words, the infrastructure information is linked to the transport-level response prior to sending the response on the transport-level reply flow.

Thereafter, initiator endpoint 105 can utilize the sequence identifier 108 for sending application-level messages 106 on the request flow of subsequent connections for the request-response transport. Each message should be identified by a message number 114 for ordering and other reliable messaging purposes. When the acceptor endpoint 110 receives the application-level message 106, it will typically respond with a transport-level response 104 that includes RM information 112. More specifically, the RM infrastructure information 112 may include the sequence identifier 108 and an acknowledgment 128 for one or more application-level messages.

Note that the transport-level response 104 need not include RM information, but may simply be the standard transport-level response. For example, as shown in the next exchange, application-level one-way message 118 is sent that includes the sequence identifier 108 and a last message 116 header (typically, it will also include a message number not shown). After initiator endpoint 105 sends the message across the request flow of the transport, acceptor endpoint 110 in this instance responds on the reply flow with a standard transport-level null response 122. As mentioned above, such responses may be sent in order to comply with the request-response transport protocol. Note in this instance, however, that in order to comply with the RM protocol; acceptor endpoint 110 should eventually send an acknowledgment 128 for the message. As mentioned above, if no acknowledgments are received after a certain time limit, a predetermined number of retries, or any other retry-policy governing mechanism, a failure notice may be raised to the application layer.

Assuming an acknowledgment for the last message is received by the initiator endpoint 105, thereafter, a terminate sequence 126 that includes the sequence identifier 108 is sent across another request flow of the request-response transport protocol. Finally, in this example, the acceptor endpoint 110 responds with another transport-level null response 124. In such instance, both sides may consider the sequence session terminated. Note also that rather than sending a null response 124 that the acceptor endpoint 110 could have also responded with an acknowledgment for the terminate sequence message 126.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and or non-functional acts may be described or claimed in a particular order, the present invention is not necessarily limited to any particular ordering or combination of steps and/or acts. Further, the use of steps and/or acts in the recitation of the claims—and in the following description of the flow chart for FIG. 2—is used to indicate the desired specific use of such terms.

Figure 2:
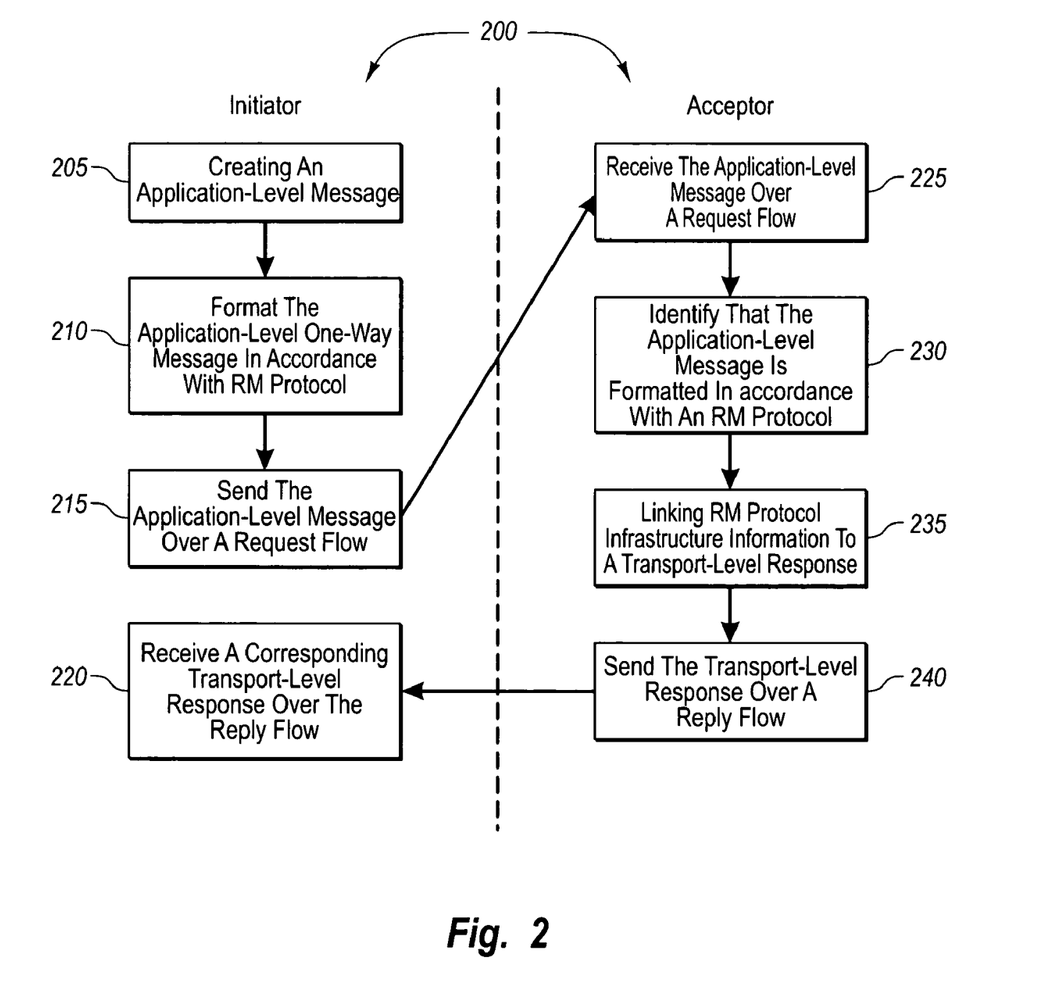
FIG. 2 illustrates a flow diagram of a method of providing a Reliable Messaging protocol for a distributed system when sending application level messages over a request-response transport protocol in accordance with example embodiments.

FIG. 2 illustrates a flow chart for various exemplary embodiments of the present invention. The following description of FIG. 2 will occasionally refer to corresponding elements from FIGS. 1A and 1B. Although reference may be made to a specific element from these FIG.ures, such elements are used for illustrative purposes only and are not meant to limit or otherwise narrow the scope of the present invention unless explicitly claimed.

FIG. 2 illustrates an example flow chart of a method 200 of providing an RM protocol when sending application-level messages over a request-response transport protocol. On the initiator side, method 200 includes an act of creating 205 an application-level message. For example, initiator endpoint 105 may create an application-level message for transferring to an acceptor endpoint 110 in a reliable one-way message exchange pattern. Typically, the initiator endpoint 105 will not be addressable, i.e., the application-level 115 message will typically include input information for processing at the acceptor endpoint 110, without application level output 160 information flowing back from the acceptor endpoint 110 to the initiator endpoint 105. Of course, as previously described, infrastructure messages (e.g., ack request, create sequence, terminate sequence, etc.) may also be linked to the application-level message 115.

Note, however, that typically the infrastructure message requesting initiation of a sequence session (as well as the termination infrastructure message) is not linked to application-level messages. In fact, usually the create sequence session is created by the RM layer 120 in response to a local API call such as, e.g., CreateSession or Session.Open from the application layer 115. Accordingly, as previously mentioned, any specific process for establishing or initiating a sequence session (and/or termination of a sequence session) is used for illustrative purposes only and is not meant to limit or otherwise narrow the scope of the present invention unless explicitly claimed.

Regardless of whether infrastructure information is linked with the application-level message, method 200 also includes an act of formatting 210 the a application-level message in accordance with the RM protocol. For example, reliable messaging level 120 at the initiator endpoint 105 may format the application-level message and store a copy of the application-level message 135 in the initiator buffer 130 for retry purposes. Next, method 200 includes an act of sending 215 the application-level message over a transport request flow. That is, e.g., the message is delivered from the reliable messaging layer 120 down to the request-response transport layer 125. The message is then sent on the request flow 145 to the acceptor endpoint 110. The request-response transport protocol may be an anonymous transport, e.g., anonymous HTTP or other similar request-response transport protocol.

In any event, on the acceptor side method 200 further includes an act of receiving 225 the application-level over the request flow. For example, acceptor endpoint 110 may receive the application-level message over the request flow 145 at the request-response transport layer 156. Thereafter, method 200 also includes an act of identifying 230 that the application-level message is formatted in accordance with RM protocol. Further, method 200 includes an act of linking 235 RM protocol infrastructure information to a transport-level response. For instance, the reliable messaging layer 155 may store the application-level message 170 in the acceptor buffer 165 for subsequent processing by the application layer 160 of acceptor endpoint 110. Thereafter, reliable messaging layer 155 can link the transport-level response to RM infrastructure information 112 corresponding to a reliable exchange of one or more application-level messages sent from the initiator 105 to the acceptor 110.

The infrastructure information linked to the transport-level response may be an acknowledgment response indicating that the acceptor has reliably received one or more application-level messages. The acknowledgment response may include an acknowledgment response for the application-level message sent on the request flow. Further, the formatted application-level message may be linked to an acknowledgment request in accordance with the RM protocol. In such instance, the acknowledgment response is in reply to the acknowledgment request. Alternatively, the RM information may be a sequence identifier 108 in the case where the application-level message is linked to a request to create a unidirectional sequence session.

After formatting the transport-level response, method 200 includes an act of sending 240 the transport-level response over a reply flow. Similarly, on the initiator side method 200 also includes an act of receiving 220 the corresponding transport-level response over a reply flow. For example, acceptor endpoint 110 sends a transport-level response, e.g., 104, 114, across the reply flow 140 and it is then received at the initiator endpoint 105. The RM or infrastructure-level response is then extracted from the transport-level response and given to the RM layer 120. The RM layer 120 then deletes the copy of the message 135 from initiator buffer 130.

Other example embodiments provide that prior to sending the application-level message; a unidirectional sequence session identified by a unique sequence identifier is established between the initiator 105 and the acceptor 110. Accordingly, the application-level message will include the unique sequence identifier. Thereafter, a subsequent message that includes the unique sequence identifier may be formatted in accordance with the RM protocol and sent over a request flow 145 of a request-response transport. This subsequent message may be sent before receiving an acknowledgment response corresponding to the original application-level message. Thereafter, a subsequent transport-level response is received at the initiator 105 over a reply flow 140 of the request-response transport.

Still other embodiments provide for that the subsequent message is an application-level message that includes input information for processing at the acceptor endpoint 110 without application-level output information flowing back to the initiator endpoint. In this embodiment, the subsequent transport-level response may be linked to RM protocol infrastructure information 112, which includes an acknowledgment response 128 indicating that the acceptor endpoint 110 has received at least the subsequent application-level message.

In the event that the subsequent message is an RM protocol infrastructure message that includes a terminate sequence element 126, the subsequent transport level response may be sent in order to comply with the request-response transport protocol, e.g., null response 124. Alternatively, the transport-level response may include RM protocol infrastructure information, which is an acknowledgment response 128 indicating that the acceptor 110 has received a last application-level message in the sequence session.

Still other embodiment provide that the transport protocol can be HTTP and wherein the subsequent transport-level response is an HTTP message (e.g., 202 OK message) sent in order to comply with the request-response transport protocol. Yet other example embodiments provide that another application-level message is received for the sequence session, but arrives out of order and the acceptor endpoint drops the and does not send an acknowledgement, but a transport-level response is sent in order to comply with the request-response transport protocol.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 3:
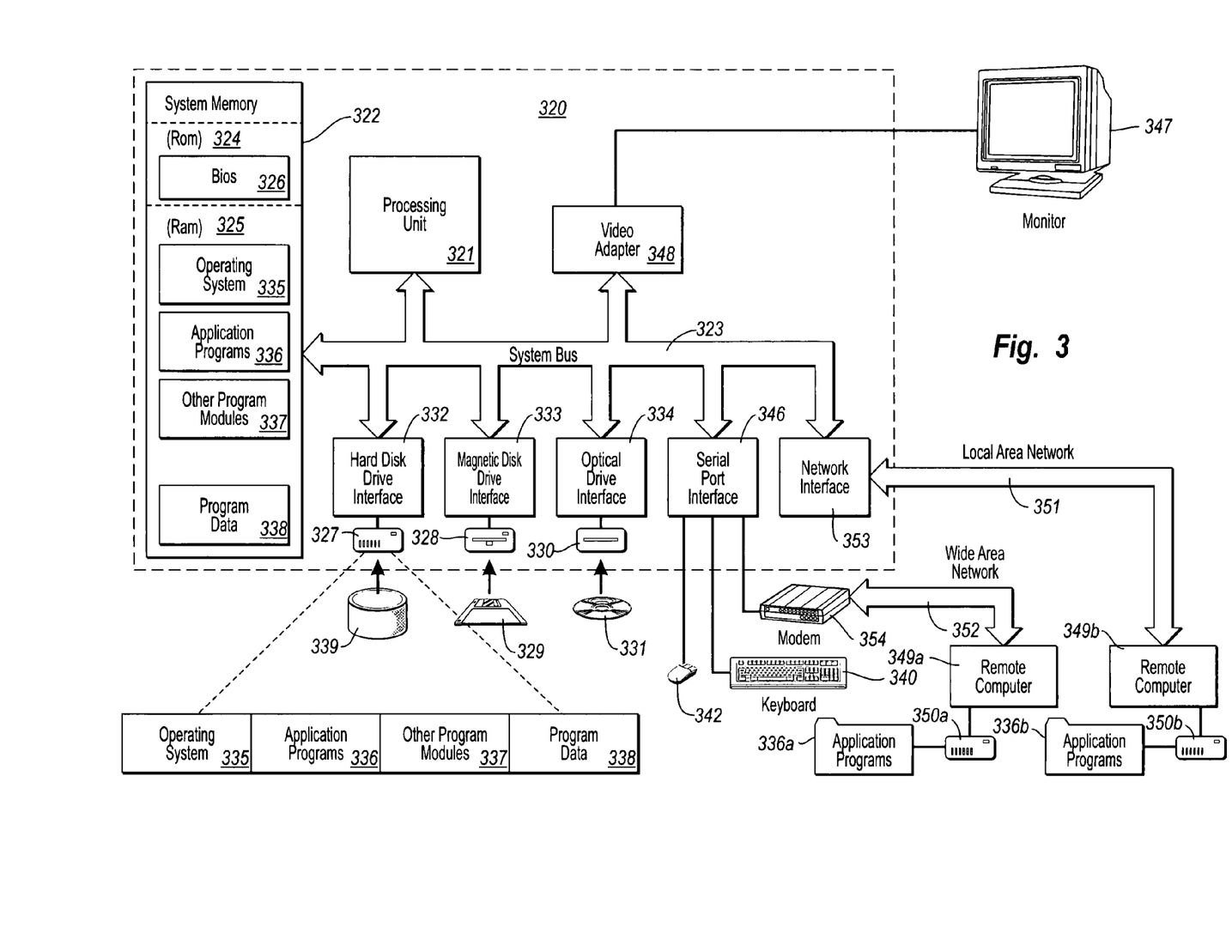
FIG. 3 illustrates an example system that provides a suitable operating environment for the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 26, containing the basic routines that help transfer information between elements within the computer 320, such as during start-up, may be stored in ROM 24.

The computer 320 may also include a magnetic hard disk drive 27 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules; depicted relative to the computer 320, or portions thereof, may be stored in the remote memory storage device. It will be appreciated that the network connections shown are exemplary and other means of establishing communications over wide area-network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At an initiator computing device in a distributed system, a method of providing a Reliable Messaging protocol for a distributed system (RM protocol) when sending application-level messages over a request-response transport protocol by leveraging existing network characteristics of the request-response transport protocol without reconfiguration or deployment of new infrastructure services, the method comprising acts of:
creating an application-level message at an initiator endpoint for transferring the application-level message to an acceptor endpoint in a reliable one-way message exchange pattern;
formatting the application-level message in accordance with a Reliable Messaging protocol for a distributed system (RM protocol);
sending the application-level message over a request flow of a request-response transport;
receiving a corresponding transport-level response over a reply flow of the request-response transport, the transport-level response linked to RM protocol infrastructure information in order to comply with the RM protocol.

2. The method of claim 1, wherein the infrastructure information linked to the transport-level response is an acknowledgment response indicating that the acceptor has reliably received one or more application-level messages.

3. The method of claim 2, wherein the acknowledgment response includes an acknowledgment response for the application-level message sent on the request flow.

4. The method of claim 3, wherein the formatted application-level message is linked to an acknowledgment request in accordance with the RM protocol, and wherein the acknowledgment response is in reply to the acknowledgment request.

5. The method of claim 1, wherein prior to sending the application-level message a unidirectional sequence session identified by a unique sequence identifier is established between the initiator and the acceptor, and wherein the application-level message includes the unique sequence identifier.

6. The method of claim 5, further comprising acts of:
formatting a subsequent message in accordance with the RM protocol, wherein the subsequent message includes the unique sequence identifier; and
sending the subsequent message over a request flow of a request-response transport.

7. The method of claim 6, further comprising acts of:
receiving a subsequent transport-level response over a reply flow of the request-response transport.

8. The method of claim 7, wherein the subsequent message is an application-level message that includes input information for processing at the acceptor endpoint without application-level output information flowing back to the initiator endpoint, and wherein the subsequent transport-level response is linked to RM protocol infrastructure information that includes an acknowledgment response indicating that the acceptor has received at least the subsequent message.

9. The method of claim 7, wherein the subsequent message is an RM protocol infrastructure message that includes a terminate sequence element, and wherein the subsequent transport-level response is either received in order to comply with the request-response transport protocol or includes RM protocol infrastructure information that includes an acknowledgment response indicating that the acceptor has received at least a last application-level message in the sequence session.

10. The method of claim 7, wherein the subsequent transport-level response is received in order to comply with the request-response transport protocol.

11. The method of claim 10, the transport protocol is HTTP, and wherein the subsequent transport-level response is a HTTP compliant message.

12. The method of claim 6, wherein the subsequent message is sent before receiving an acknowledgment response corresponding to the application-level message.

13. At an acceptor computing device in a distributed system, a method of providing a Reliable Messaging protocol for a distributed system (RM protocol) when sending application-level messages over a request-response transport protocol by leveraging existing network characteristics of the request-response transport protocol without reconfiguration or deployment of new infrastructure services, the method comprising acts of:
receiving an application-level message in a reliable one-way message exchange pattern from an initiator to an acceptor, the application-level message being received over a request flow of a request-response transport protocol;
identifying that the application-level message is formatted in accordance with a Reliable Messaging for a distributed system (RM protocol);
linking RM protocol infrastructure information to a transport-level response, the infrastructure information corresponding to a reliable exchange of one or more application-level messages sent from the initiator to the acceptor; and
sending the transport-level response over a reply flow of the request-response transport protocol in order to comply with the RM protocol.

14. The method of claim 13, wherein the infrastructure information linked to the transport-level response is an acknowledgment response indicating that the acceptor has reliably received one or more application-level messages.

15. The method of claim 14, wherein the acknowledgment response includes an acknowledgment response for the application-level message sent on the request flow.

16. The method of claim 15, wherein the formatted application-level message is linked to an acknowledgment request in accordance with the RM protocol, and wherein the acknowledgment response is in reply to the acknowledgment request.

17. The method of claim 13, wherein prior to receiving the application-level message a unidirectional sequence session identified by a unique sequence identifier is established between the initiator and the acceptor, and wherein the application-level message includes the unique sequence identifier.

18. The method of claim 17, further comprising acts of:
receiving a subsequent message that includes the unique sequence identifier over a request flow of a request-response transport; and
identifying that the subsequent message is formatted in accordance with the RM protocol.

19. The method of claim 18, further comprising acts of:
sending a subsequent transport-level response over a reply flow of the request-response transport.

20. The method of claim 19, wherein the subsequent message is an application-level message that includes input information for processing at the acceptor endpoint without application-level output information flowing back to the initiator endpoint, and wherein the subsequent transport-level response is linked to RM protocol infrastructure information that includes an acknowledgment response indicating that the acceptor has received at least the subsequent message.

21. The method of claim 20, wherein the subsequent message is an RM protocol infrastructure message that includes a terminate sequence element, and wherein the subsequent transport-level response is either received in order to comply with the request-response transport protocol or includes RM protocol infrastructure information that includes an acknowledgment response indicating that the acceptor has received at least a last application-level message in the sequence session.

22. The method of claim 20, wherein the subsequent transport-level response is received in order to comply with the request-response transport protocol.

23. The method of claim 22, the transport protocol is HTTP, and wherein the subsequent transport-level response is a HTTP compliant message.

24. The method of claim 18, wherein the subsequent message is received before sending an acknowledgment response corresponding to the application-level message.

25. At an initiator computing device in a distributed system, a computer readable medium encoded with a computer program for implementing a method of providing a Reliable Messaging protocol for a distributed system (RM protocol) when sending application-level messages over a request-response transport protocol by leveraging existing network characteristics of the request-response transport protocol without reconfiguration or deployment of new infrastructure services, the computer program product comprising one or more computer readable media having stored thereon computer executable instructions that, when executed by a processor, can cause the distributed computing system to perform the following:
create an application-level message at an initiator endpoint for transferring the application-level message to an acceptor endpoint in a reliable one-way message exchange pattern;
format the application-level message in accordance with a Reliable Messaging protocol for a distributed system (RM protocol);
send the application-level message over a request flow of a request-response transport;
receive a corresponding transport-level response over a reply flow of the request-response transport, the transport-level response linked to RM protocol infrastructure information in order to comply with the RM protocol.

26. The computer readable medium of claim 25, wherein prior to sending the application-level message a unidirectional sequence session identified by a unique sequence identifier is established between the initiator and the acceptor, and wherein the application-level message includes the unique sequence identifier.

27. The computer readable medium of claim 25, wherein the transport-level response is received in order to comply with the request-response transport protocol.

28. The computer readable medium of claim 27, the transport protocol is HTTP, and wherein the subsequent transport-level response is a HTTP compliant message.

29. The computer readable medium of claim 25, wherein the infrastructure information linked to the transport-level response is an acknowledgment response indicating that the acceptor has reliably received one or more application-level messages.

30. The computer readable medium of claim 29, wherein the acknowledgment response includes an acknowledgment response for the application-level message sent on the request flow.

31. The computer readable medium of claim 30, wherein the formatted application-level message is linked to an acknowledgment request in accordance with the RM protocol, and wherein the acknowledgment response is in reply to the acknowledgment request.

32. At an acceptor computing device in a distributed system, a computer readable medium encoded with a computer program for implementing a method of providing a Reliable Messaging protocol for a distributed system (RM protocol) when sending application-level messages over a request-response transport protocol by leveraging existing network characteristics of the request-response transport protocol without reconfiguration or deployment of new infrastructure services, the computer program product comprising one or more computer readable media having stored thereon computer executable instructions that, when executed by a processor, can cause the distributed computing system to perform the following:

receive an application-level message in a reliable one-way message exchange pattern from an initiator to an acceptor, the application-level message being received over a request flow of a request-response transport protocol;

identify that the application-level message is formatted in accordance with a Reliable Messaging for a distributed system (RM protocol);

link RM protocol infrastructure information to a transport-level response, the infrastructure information corresponding to a reliable exchange of one or more application-level messages sent from the initiator to the acceptor; and send the transport-level response over a reply flow of the request-response transport protocol in order to comply with the RM protocol.

33. The computer readable medium of claim 32, wherein the transport-level response is received in order to comply with the request-response transport protocol.

34. The computer readable medium of claim 32, the transport protocol is HTTP, and wherein the subsequent transport-level response is a HTTP compliant message.

35. The computer readable medium of claim 34, wherein the subsequent message is received before sending an acknowledgment response corresponding to the application-level message.

36. The computer readable medium of claim 32, wherein the infrastructure information linked to the transport-level response is an acknowledgment response indicating that the acceptor has reliably received one or more application-level messages.

37. The computer readable medium of claim 36, wherein the acknowledgment response includes an acknowledgment response for the application-level message sent on the request flow.

38. The computer readable medium of claim 37, wherein the formatted application-level message is linked to an acknowledgment request in accordance with the RM protocol, and wherein the acknowledgment response is in reply to the acknowledgment request.

39. The computer readable medium of claim 32, wherein prior to receiving the application-level message a unidirectional sequence session identified by a unique sequence identifier is established between the initiator and the acceptor, and wherein the application-level message includes the unique sequence identifier.

* * * * *